March 16, 1926.
G. W. ALDEEN
1,577,153
MOVEMENT LIMITING DEVICE FOR SPOTLIGHTS
Filed Feb. 15, 1924
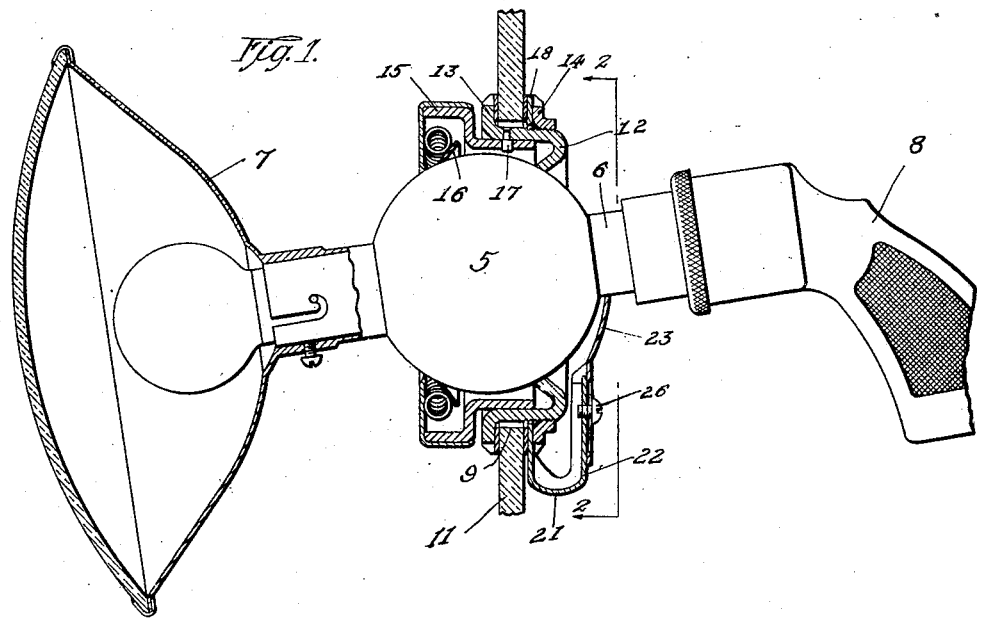
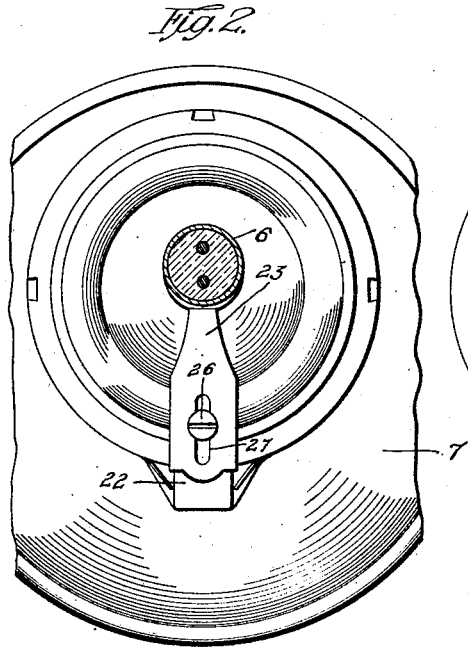
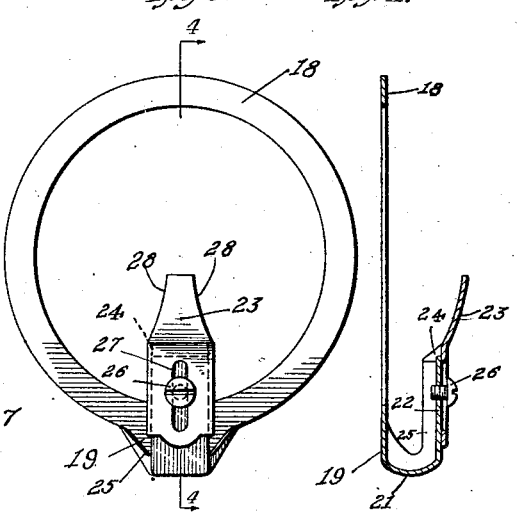
Inventor
Gedor W. Aldeen
By Wilson & McKenna
Attys.

Patented Mar. 16, 1926.

1,577,153

UNITED STATES PATENT OFFICE.

GEDOR W. ALDEEN, OF ROCKFORD, ILLINOIS, ASSIGNOR TO FYRAC MANUFACTURING CO., OF ROCKFORD, ILLINOIS, A CORPORATION OF ILLINOIS.

MOVEMENT-LIMITING DEVICE FOR SPOTLIGHTS.

Application filed February 15, 1924. Serial No. 692,976.

*To all whom it may concern:*

Be it known that I, GEDOR W. ALDEEN, a citizen of the United States, residing in the city of Rockford, county of Winnebago, and State of Illinois, have invented certain new and useful Improvements in Movement-Limiting Devices for Spotlights, of which the following is a specification.

This invention relates to windshield spotlights, and has more particular reference to means for limiting directional movement of the spotlight device to prevent the light being thrown in certain prescribed zones, in order to comply with certain legal requirements in certain States and to avoid the danger and inconvenience to the public, which would result from unlimited operation of the spotlight.

The primary purpose of my invention is to provide an improved means for limiting directional movement of a spotlight, designed particularly for that class of spotlights employing a spotlight-carrying device mounted for universal movement in a housing, my present improvement consisting in providing an attachment which may be applied to the housing, preferably without additional fastening means, thus enabling quick and easy installation of such attachment wherever required.

In the preferred embodiment of my invention, I have provided a stop-supporting ring adapted to be clamped in position by a housing clamping ring or other part employed for securing the housing on a windshield; and I have also aimed to provide an adjustable stop member mounted on an extension from said supporting ring, whereby the prohibited zone may be varied, if required, and also whereby said zone may be properly determined in cases where windshields are supported or positioned at different angles.

Other objects and attendant advantages will be appreciated by those familiar with this art as the invention becomes better understood by reference to the following description when considered in connection with the accompanying drawings, in which—

Figure 1 is a vertical sectional view through a windshield spotlight equipped with an attachment embodying my invention;

Fig. 2 is a section taken on the line 2—2 of Fig. 1;

Fig. 3 is an elevation of the attachment, removed; and

Fig. 4 is a section taken on the line 4—4 of Fig. 3.

In the drawing, I have illustrated my improved movement-limiting device in connection with a windshield spotlight, the construction of which forms the subject matter of my co-pending application, Serial No. 692,975. This spotlight is characterized by a spotlight mounted for universal movement in a housing, which in turn is mounted in a windshield and clamped to the opposite side thereof about said opening. There are various windshield spotlights of this general character and the present invention is intended for application to any of them.

The present spotlight design, shown for purpose of illustration merely, comprises generally stated, a ball member 5, a stem 6 passing through the ball member and equipped at one end with a spotlight 7 and at the other end with a handle 8, and a housing in which the ball member is mounted for universal movement and which in turn is disposed in an opening 9 in the windshield 11 and secured thereto by suitable clamping means. Said housing comprises in this instance, a fixed socket ring having a clamping flange 13 adapted to clamp against the front of the windshield, a ring-nut 14 threaded on the socket ring 12 and adapted to clamp against the rear face of the windshield for thereby rigidly securing the housing part 12 to said windshield, and a spring-containing sleeve designated generally by 15, carrying a spring-pressed socket ring 16 and having a bayonet-joint connection with the housing part 12. In this case, only one of the lock-pins 17 forming part of the bayonet joint is shown. This however, is simply incidental to the specific housing structure herein disclosed, in which the spring-containing unit 15 is detachable from the fixed socket ring or housing part 12 without disturbing the mounting of the latter on the windshield. It will be manifest that the spotlight device is capable of unrestricted universal movement for directional control of the light, its movement being limited only by the stem 6 striking the housing.

My improved attachment which limits the tilting movement of the spotlight device so that the light cannot be thrown in a certain zone, as above described, comprises in the preferred embodiment, a stop-supporting ring 18 adapted to be interposed between the ring-nut 14 and the windshield and to be clamped and held in position by tightening the ring-nut, or in other words, by the same means employed for clamping or securing the spotlight-carrying housing on the windshield or other support. This ring has a marginal extension 19 which is turned rearwardly at 21, and then upwardly, terminating in a stop-supporting arm 22, in the present case parallel with the ring body 18. Upon this arm 22 is adjustably mounted a stop member 23, which it will be seen is directed toward and is disposed in a plane intersecting the major axis of the stem 6 or spotlight-carrying means. This attachment is preferably formed of sheet metal, stamped or pressed to shape, and both the stop 23 and its supporting arm 22 are reinforced by ribs 24 and 25 respectively. The ribs or flanges 24 overlie the similar parts 25 on the arm 22 and constitute therewith a guide means for holding the stop member 23 in alignment with its supporting arm. The stop member 23 is therefore, adjustable lengthwise on said arm 22 in the vertical plane thereof for the purpose of varying the location of the prohibited zone or for properly locating it. Such adjustment is desired because of the structural and dimensional variations in the mountings of spotlights of this kind on different windshields. A screw 26 passing through a slot 27 in the stop member 23 and threaded in the arm 22 so as to secure said stop member in any adjusted position on said arm. In the present instance, the arm 22 is positioned relatively close to the housing and the stop member 23 is curved at its upper end to conform to the shape of the ball member 5. In the set position of the parts as shown, the stem 6 will by contact with the sides 28 of the stop member, prevent horizontal movement of the spotlight in a zone directly ahead, except when tilted upwardly at the rear to clear the top of the stop, in which tilted position (shown in Figs. 1 and 2) the light rays are thrown downwardly so as to strike the ground quite close to the automobile and outside of the prohibited zone above mentioned. This construction allows a horizontal sweep of the light close to the automobile for illuminating the road bed and also allows full freedom of directional movement at both sides of the stop member for throwing the light onto the edge of a road bed, sign posts, house numbers, etc.

It will be manifest that the stop member 23 may be quickly and easily adjusted for the purposes above mentioned, and that the stop-supporting ring may be applied to any spotlight device of the character in mind without the use of fastening means other than those embodied as a permanent part in such device.

It is believed that the foregoing conveys a clear understanding of the objects prefaced above, and while I have illustrated but a single working embodiment it should be understood that changes might be made in details of construction without departing from the spirit and scope of the invention as expressed in the appended claims.

I claim:

1. In combination, a support having an opening, a housing secured to the support around the opening by means including a threaded part passing through the opening and a ring-nut threaded on said part and adapted to be tightened thereon for clamping said housing to said support, a spotlight-carrying device mounted on said housing for directional movement, a stop and a stop-supporting ring positioned on said housing and clamped therewith to the support by said ring-nut.

2. In combination, a support having an opening, a housing secured to the support around the opening by means including a threaded part passing through the opening and a ring-nut threaded on said part and adapted to be tightened thereon for clamping said housing to said support, a spotlight-carrying device mounted on said housing for directional movement, a stop-supporting ring positioned on said housing and clamped therewith to the support by said ring-nut, and a stop member adjustably mounted on said ring for limiting tilting movement of the spotlight device.

3. In combination, a support having an opening, a mounting in said opening, a stem passing through said mounting supported thereby for directional movement therein, a spotlight on one end of said stem, a handle on the other end, a stop-supporting element carried by the mounting in rigid relation thereto and terminating in an end portion extending toward the stem and intersecting the major axis thereof, and a stop member adjustably mounted on said end portion of said arm for limiting tilting movement of said stem.

4. In combination, a support having an opening, a spotlight-carrying device including a ball member in said opening, a housing in which said ball member is mounted for universal movement and which is clamped to the support by means including a clamping nut circumscribing the ball member, and means for limiting the tilting of said device, comprising a supporting ring circumscribing the ball member and clamped by said clamping nut in fixed relation to the support, said supporting ring having a marginal extension turned outwardly therefrom and then inwardly terminating in an arm directed toward and in a plane intersecting the major axis of said spotlight device, and a stop adjustably mounted on said supporting arm for limiting tilting movement of said spotlight device.

GEDOR W. ALDEEN.